Figures 7, 8:
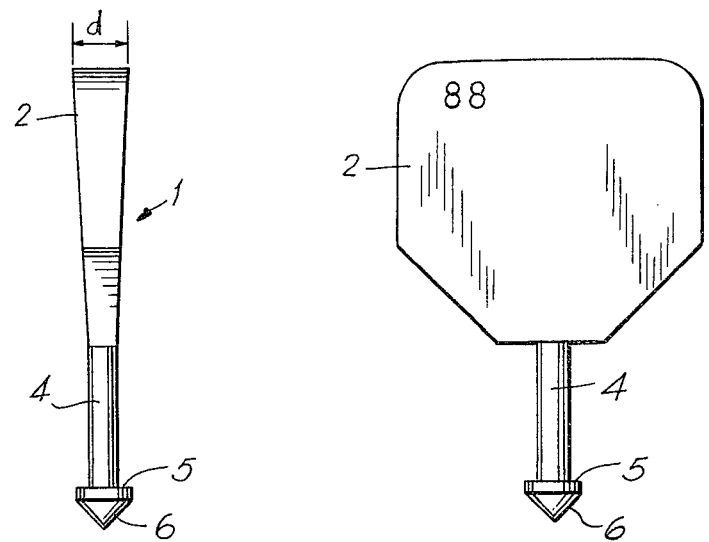

United States Patent [19]

Mackenzie

[11] 4,250,643
[45] Feb. 17, 1981

[54] ANIMAL IDENTIFICATION TAGS

[76] Inventor: Roderick D. Mackenzie, 1 Middle Rd., Havelock North, New Zealand

[21] Appl. No.: 913,607

[22] Filed: Jun. 7, 1978

[30] Foreign Application Priority Data

Jun. 9, 1977 [NZ] New Zealand .......................... 184356

[51] Int. Cl.³ ............................................... G09F 3/00
[52] U.S. Cl. ...................................................... 40/301
[58] Field of Search ................... 40/301, 300, 302, 20, 40/21 R, 22

[56] References Cited
U.S. PATENT DOCUMENTS

| 492,838 | 3/1893 | Rogers | 40/301 |
| 3,388,492 | 6/1968 | Nichols | 40/301 |
| 3,595,201 | 7/1971 | Dumas | 40/301 |
| 3,896,577 | 7/1975 | Hayes | 40/301 |

*Primary Examiner*—John F. Pitrelli
*Attorney, Agent, or Firm*—Haseltine and Lake

[57] ABSTRACT

An ear tag for animals is disclosed particularly adapted to be held in a cartridge for use with an applicator. The ear tags comprise a male flag member and a female member, the male flag member being generally T-shape, such that the shank of the flag member extends from the edge of the flag portion in the same plane as the plane of the flag portion. The thickness of the shank and flag portion is such that two or more male members can be placed in face to face abutment with each other.

16 Claims, 9 Drawing Figures

FIG.1 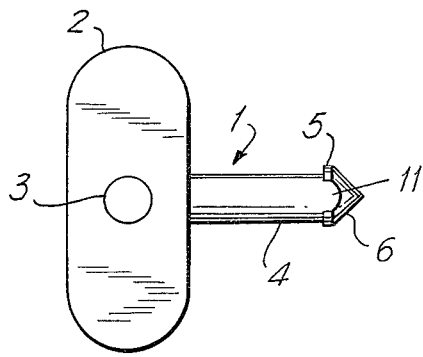　　FIG.2 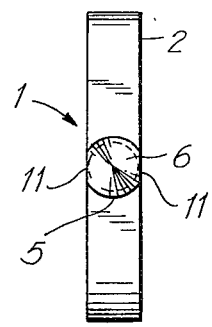
FIG.3 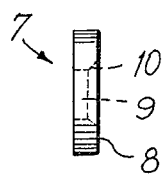　　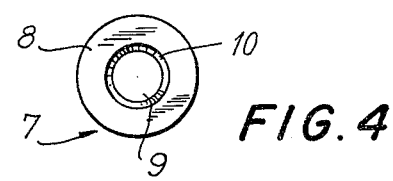 FIG.4
FIG.5 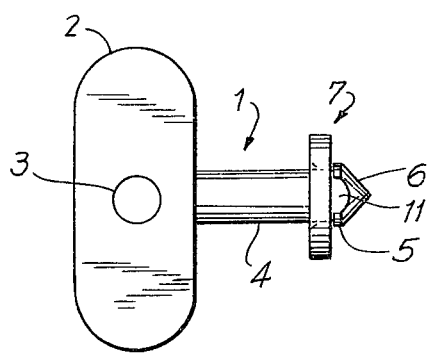　　FIG.6 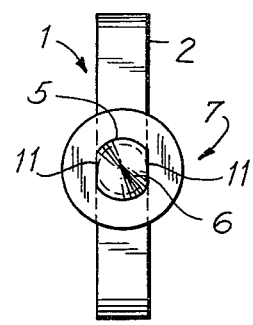

ANIMAL IDENTIFICATION TAGS

This invention relates to improvements in animal identification tags and more particularly to tags which are to be located on the ear of an animal.

It has been a disadvantage to the present time in that the tagging of animals by the insertion of tags through the animals' ear has usually required a two man operation with one person holding the animal and inserting the tags whilst the other person loads a single tag into a tag applicator. Such "one-shot" tag applicators are well known in the art to which this present invention relates. It is thus an object of the present invention to provide an ear tag for an animal which is adapted so as to enable a plurality of such ear tags to be positioned together such as in the form of a cartridge such that a cartridge of such ear tags can then be loaded into a "multi-shot" applicator. The present invention is thus particularly directed towards enabling a one man operation in the ear tagging of animals and more particularly provides an ear tag specifically adapted for a "multi-shot" applicator.

Further objects of this invention will become apparent from the following description.

According to one aspect of the present invention there is provided a male flag member of an ear tag assembly, the other part of said assembly being provided as a female locating member engagable with said male flag member, said flag member being of a generally T shape, a flag portion forming the cross-bar of the T shape, a shank extending outwardly from one edge surface of said flag portion to provide the tail of said T shape, the arrangement being such that the thickness of said flag member and the greatest thickness of the shank measured in the same direction as the thickness of the flag member is such that when a plurality of flag members are arranged in abutment one with the other with the flag portions face to face, the longitudinal axis of each shank is substantially parallel to each other shank and being such that the shank and the portion of the flag portion aligned with the longitudinal axis of the shank is substantially rigid against compression along said longitudinal axis.

The present invention provides an ear tag for an animal having a male flag member having a shank which can be inserted through, or through a hole in, the ear of the animal and which shank can then engage with a female locating member which prevents the withdrawal of the shank from the ear.

Previously, such two part ear tags have been applied by applicators in which each part of the ear tag is individually loaded in the applicator for insertion in the ear of the animal. This results in tagging operations being inefficient and time consuming with a wasting of man power in that a two man operation is usually required.

The present invention provides a male flag member which is adapted so as to enable a plurality of same to be positioned in abutment one with the other such as in the form of a cartridge which can then be inserted within an applicator, so that each flag member is automatically positioned in the applicator for insertion in the ear of the animal.

In its broadest form the present invention thus provides a male flag member for a two part ear tag which flag member is of a generally T shape with the cross bar of the T being provided by a flag portion from an edge surface of which depends a shank. The shank is adapted to be inserted through the ear of an animal. For ease of operation it is preferred that the shank be capable of piercing the animal's ear and for this purpose it is provided with a pointed projection. The pointed projection where it meets with the said shank is provided with a shoulder, which shoulder can engage behind a female locating member on an opposite side of the animal's ear from the aforesaid flag portion.

The pointed projection can be physically forced through the animal's ear by use of a suitable applicator and for this purpose the shank and at least that part of the male flag member aligned with the longitudinal axis of the shank needs to be of relatively rigid material against compression along the longitudinal axis of the shank. Pressure exerted on the edge of the flag portion in line with the longitudinal axis of the shank is then transmitted through the shank to the pointed projection to enable the projection to pierce the ear. Preferably the male member is formed completely of substantially rigid material.

The male flag member may be of metal or integral moulded plastics construction. The female locating member is preferably of an at least partially resilient material so as to facilitate the insertion of the pointed projection through an aperture provided within the female member. The said aperture may be bevelled or chamfered so as to facilitate this insertion of the pointed projection. Thus in one example of this invention the male member may be of metal whilst the female member may be of a plastics material which, whilst substantially rigid, would still have at least a partial resilience to enable the insertion of the pointed projection of the male member through the aperture in the female member.

In use a plurality of male flag members are mounted in abutment with the flag portion face to face one with the other in a cartridge which can be inserted in a suitable applicator. The applicator selects one flag member at a time and a suitable pressure member exerts force on the edge of the flag portion opposite the shank to force the flag member out of the applicator and the projection through an animal's ear to engage with the aperture in the female member behind the ear. In order to facilitate selection of one flag member at a time each member is adapted to be mounted so that each shank is substantially parallel to each other. In a preferred form of the invention the greatest thickness of the male flag portion is substantially the same as the greatest thickness of the shank in the same plane as the direction of measurement of the thickness of the flag portion. For this purpose the thickness of the flag portion can be substantially constant and the shank can be substantially the same with the shoulder of the pointed projection protruding outwardly from the surface of the shank around a partial circumference of the shank with flats being provided in the same plane as the two surfaces of the flag portion in the remaining circumferential surface of the shank.

It is a further important preferred feature of the invention to provide each surface of the male flag members such that, when mounted in the aforesaid cartridge, the selected flag member on being dispensed slides smoothly over the adjacent face of the adjacent flag member.

The flag portion may be provided with an aperture therein which facilitates the connection thereto of any identifying material which may be required such as a metal label or the like or provided of such a size for enabling individual identification characters, e.g. numbers to be printed thereon.

The invention will now be illustrated by reference to the accompanying drawings wherein:

FIG. 1: shows a side view of a male flag member according to a preferred embodiment of the invention.

FIG. 2: shows an end view of the male flag member of FIG. 1.

FIG. 3: shows a side view of a female locating member for use with the male flag member of FIG. 1.

FIG. 4: shows a plan view of the female member of FIG. 3.

FIG. 5: shows a side view of the male and female members of the preceding figures engaged with one another.

FIG. 6: shows an end view of FIG. 5.

Figure 9:
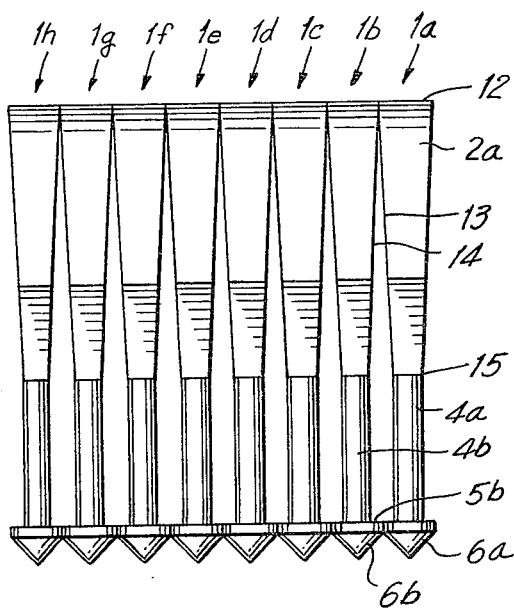

FIGS. 7, 8 and 9: show views of an optional embodiment of a male flag member of the present invention.

Referring to the drawings, a male flag member referenced generally by arrow 1 comprises a flag portion 2, from one edge surface of which depends a shank 4. At the end of the shank 4 is provided a pointed projection 6 having a shoulder 5.

Thus, as will be appreciated particularly with reference to FIGS. 7 to 9 of the drawings a plurality of the male flag members 1a–1h etc., can be positioned side by side such as in the form of a magazine which can then be inserted within an applicator (not shown). The applicator will select flag member 1a at the end of the cartridge and apply pressure to edge 12 to force member 1a downwardly whilst the ear (not shown) of an animal is held in position to be encountered by the pointed projection 6 and pierced to then engage with a female member (not shown) suitably positioned to allow the projection to pass through an aperture in the female member. To facilitate selection of an individual flag member by the applicator, the axis of each shank 4a, 4b etc., needs to be parallel to each other. In order to align the members face to face in such a fashion the dimension of greatest thickness, d, (in FIG. 7) of the flag portion needs to be substantially the same as the diameter of the shoulder in the same plane as the direction of measurement of the thickness d.

Referring to FIG. 2 of the drawings the thickness of the flag portion 2 of the male member 1 together with the thickness of the shank 4 and its projection 6 is formed substantially constant, by providing flats 11 on shoulder 5 in the same plane as the plane of each face of flag portion 2.

An alternative form of the invention is shown with reference to FIGS. 7 and 9 of the drawings. As member 1a (FIG. 9) is dispensed and is forced in a downward direction its surface 13 slides over the adjacent surface 14 of adjacent member 1b. Shoulder 5b of the adjacent member will engage any projection which exists on surface 13 of member 1a which can lead to jamming of the applicator. In order to avoid this difficulty each facing surface of the individual male members is formed with at the most one abrupt projection, extending outwards from the surface. Desirably as shown in FIG. 9 the thickness of flag portion 2a varies smoothly from a position of minimum thickness to a position of maximum thickness. Preferably the variation is a uniform increase from the front edge 13 to the position of greatest thickness at the rear edge.

Referring particularly to FIGS. 3 and 4 of the accompanying drawings the female locating member 7 may, as shown, be substantially in the form of a washer having a rounded edge portion 8 within which is provided a hole or aperture 9. The aperture 9 may be provided with a bevelled or chamfered edge 10 so as to facilitate the insertion therethrough of the pointed projection 6 of the male member 1.

The male and female members 1 and 7 may each be formed from any suitable material such as plastics, metal or the like, although at least a partial resilience in the material used should be provided for the insertion of the pointed projection 6 through the aperture 9. For this purpose the male member 1 may be of metal whilst the female member 7 may be of plastic which latter material whilst substantially rigid provides an at least partial resilience about its aperture 9.

The male member 1 is shown provided with an aperture 3 through which identification material may be located such as a metal identification flag with appropriate indicia provided thereon. Alternatively flag portion 2 can be enlarged as shown in FIG. 8 to carry suitable individual identification characters thereon, e.g. numbers "88".

In FIGS. 5 and 6 of the accompanying drawings the male member 1 is shown with its pointed projection 6 inserted within the female member 7 with its shoulder 5 preventing its escape from such engagement. It is to be appreciated that the ear of the animal, which would have been pierced by the projection 6, would now be located within the space defined between the female member 7 and the flag portion 2 and along the shank 4 of the male member 1.

Thus, this invention enables a plurality of male flag members 1 to be located in side by side relationship such as in the form of a cartridge which can then be inserted within an applicator of suitable design and construction and which may operate such as in the manner of a staple gun. The applicator may also be provided with a facility whereby a plurality of female members 7 can be located therein and successively engaged by successive male members 1 such that a one handed, single man tagging operation is required.

Where in the aforegoing description specific components and integers have been referred to in respect of which known equivalents exist in the art to which this present invention relates then such equivalents are incorporated herein as if individually set forth.

Although this invention has been described by way of example and with reference to one embodiment of the invention it is to be understood that modifications and improvements may be made thereto without departing from the scope of the invention.

I claim:

1. A male identification flag member of an ear tag assembly adapted to be held in a cartridge for use with an applicator, the other part of said assembly being provided as a female locating member engagable with said male flag member, said flag member being of a generally T shape, a flag portion forming the cross-bar of the T shape, a shank extending outwardly from one edge surface of said flag portion to provide the tail of said T shape, the arrangement being such that the thickness of said flag portion and the greatest thickness of the shank measured in the same direction as the thickness of the flag portion is such that when a plurality of flag members are arranged in abutment one with the other with the flag portions face to face, the longitudinal axis of each shank is substantially parallel to each other shank, and being such that the shank and the portion of the flag portion aligned with the longitudinal axis of the shank is substantially rigid against compression along said longitudinal axis.

2. A male flag member of an ear tag assembly as claimed in claim 1 wherein a pointed projection is provided on the end of the shank.

3. An ear tag assembly as claimed in claim 2 wherein a shoulder is provided where the pointed projection meets the said shank.

4. A male member of an ear tag assembly as claimed in claim 1 wherein the thickness of the male member measured perpendicular to the plane of the flag portion of the male member is substantially constant at any point of the male member.

5. A male member of an ear tag assembly as claimed in claim 4 wherein the shoulder is formed as two diametrically opposed portions extending circumferentially from the shank and wherein two flat portions are provided in the remaining portion of the circumference of the shank, each flat portion being parallel to and substantially within the same plane as each of two surfaces respectively of the flag portion.

6. A male member of an ear tag assembly as claimed in claim 2 wherein the thickness of the flag portion of the male member varies uniformly from a position of minimum thickness to a position of maximum thickness and where the diameter of the shoulder on the pointed projection measured in the same direction as the measurement of the dimension of greater thickness of the flag portion, is substantially the same as the said greatest thickness of the flag portion.

7. A male member of an ear tag assembly as claimed in claim 6 wherein the thickness of the flag portion increases uniformly from the edge of the flat portion to which the shank is attached to a position of greatest thickness at the opposing edge.

8. A male member of an ear tag assembly as claimed in claim 1, formed integrally of a rigid plastics material.

9. A male member of an ear tag assembly as claimed in claim 1 wherein the flag portion contains means by which identification characters can be associated therewith.

10. A male member of an ear tag assembly as claimed in claim 9 wherein the flag portion is provided of a sufficiently large size such that identification characters can be imprinted thereon.

11. An ear tag assembly comprising a male member as claimed in claim 1 together with a female member having means for receiving and retaining the shank of the male member.

12. An ear tag assembly as claimed in claim 11 wherein the female member possesses an aperture adapted to allow the pointed projection of the male member to pass therethrough and permit engagement behind the shoulder on the shank of the male member.

13. An ear tag assembly as claimed in claim 12 wherein the aperture is provided with a chamfered edge.

14. An ear tag assembly as claimed in claim 11 wherein the female member is made of a substantially resilient material in comparison to the material of the male member.

15. A plurality of male flag members each as defined in claim 1 and in face to face abutment, said male flag members being contained by a cartridge of male flag members of an eartag assembly.

16. A male flag member as defined in claim 1 and having a pointed projection on the end of the shank, a shoulder located where the pointed projection meets the shank, the thickness of the male member measured perpendicular to the plane of the flag portion of the male member being substantially constant at any point of the male member, said shoulder being formed as two diametrically opposed portions extending circumferentially from the shank, and two flat portions in the remaining portion of the circumference of the shank, each flat portion being parallel to and substantially within the same plane as each of two surfaces respectively of the flag portion, said male member being formed integrally of a rigid plastics material, said flag portion containing means by which identification characters can be associated therewith, said flag portion being of sufficiently large size such that identification characters can be imprinted thereon, a female member having means for receiving and retaining the shank of the male member, said female member possessing an aperture adapted to allow the pointed projection of the male member to pass therethrough and permit engagement behind the shoulder on the shank of the male member, said aperture having a chamfered edge said female member being made of a substantially resilient material in comparison to the material of the male member.

* * * * *